United States Patent
Sakurai et al.

(10) Patent No.: US 9,086,590 B2
(45) Date of Patent: Jul. 21, 2015

(54) LIQUID CRYSTAL DISPLAY DEVICE

(71) Applicant: Japan Display Inc., Tokyo (JP)

(72) Inventors: Yoshiaki Sakurai, Tokyo (JP); Eiji Oohira, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/056,998

(22) Filed: Oct. 18, 2013

(65) Prior Publication Data
US 2014/0125912 A1    May 8, 2014

(30) Foreign Application Priority Data
Nov. 6, 2012  (JP) .................. 2012-244516

(51) Int. Cl.
*G02F 1/1333* (2006.01)
*G02F 1/1335* (2006.01)

(52) U.S. Cl.
CPC .... *G02F 1/133528* (2013.01); *G02F 1/133308* (2013.01); *G02F 2001/133317* (2013.01); *G02F 2202/28* (2013.01)

(58) Field of Classification Search
CPC .......... G02F 1/133528; G02F 2202/28; G02F 1/133308
See application file for complete search history.

(56) References Cited

U.S. PATENT DOCUMENTS

2009/0316062 A1* 12/2009 Nishizawa ............... 349/58
2012/0162565 A1*  6/2012 Lee et al. ................ 349/58

FOREIGN PATENT DOCUMENTS

JP  2011-107391  6/2011
JP  2011-191444  9/2011

* cited by examiner

*Primary Examiner* — Wen-Ying P Chen
(74) *Attorney, Agent, or Firm* — Lowe Hauptman & Ham, LLP

(57) ABSTRACT

A liquid crystal display device of the invention includes: a rectangular polarizer attached to a liquid crystal display panel; a frame-shaped frame having four sides; a first bonding layer arranged only at a position biased toward any of edges on an upper surface of the polarizer, and bonding the polarizer to the liquid crystal display panel; and a second bonding layer arranged only at a position biased toward any of edges on a lower surface of the polarizer, and bonding the frame to the polarizer.

4 Claims, 7 Drawing Sheets

LIQUID CRYSTAL DISPLAY DEVICE

CROSS-REFERENCE TO RELATED APPLICATION

The present application claims priority from Japanese application JP 2012-244516 filed on Nov. 6, 2012, the content of which is hereby incorporated by reference into this application.

BACKGROUND OF THE INVENTION

1. Field of the Invention

The present invention relates to a liquid crystal display device.

2. Description of the Related Art

As display devices for information communication terminals, such as computers, or television receivers, liquid crystal display devices have been widely used. The liquid crystal display device displays an image by changing the alignment of liquid crystal molecules sealed between two substrates of a liquid crystal display panel, thereby changing the degree of transmission of light emitted from a backlight on the liquid crystal display panel. In recent years, the liquid crystal display device has been used especially for mobile phones or smartphones, so that the downsizing, thinning, and narrower picture-frame of the liquid crystal display device are required.

JP 2011-107391 A (Patent Document 1) discloses, as a liquid crystal display device including a backlight and a liquid crystal display panel, a configuration including polarizers attached to a liquid crystal display panel with adhesive layers, a front plate and a back plate interposing the polarizers therebetween, and a frame fixing the back plate. Moreover, JP 2011-191444 A (Patent Document 2) discloses a liquid crystal display device in which a portion of a lower surface of a polarizer and an upper surface of a surface light source device are bonded together with a light-shielding double-faced tape whose bonding strength is partially weakened.

SUMMARY OF THE INVENTION

In the case of a related-art liquid crystal display device having a polarizer and a frame directly bonded together, a substrate used for a liquid crystal display panel, a polarizer, and a frame have respectively different thermal shrinkage rates. For this reason, with the rise of temperature applied to the liquid crystal display device, the polarizer shrinks in width different from that of the liquid crystal display panel or the frame. As a result, the liquid crystal display panel, the polarizer, or the frame may bow, or a double-faced tape bonding the frame to the polarizer may peel off.

Moreover, in the liquid crystal display device disclosed in Patent Document 1, the back plate is arranged between the frame and the liquid crystal display panel. Therefore, the thickness of the liquid crystal display device is increased by the amount corresponding to the thickness of the back plate. Moreover, in the liquid crystal display device disclosed in Patent Document 2, the light-shielding double-faced tape is arranged in a region inside the frame. For this reason, the width of a picture-frame is increased by the amount corresponding to the region inside the frame.

The invention has been made in view of the circumstances described above, and it is an object of the invention to prevent the peeling off of a bonding layer bonding a liquid crystal display panel to a polarizer and a bonding layer bonding the polarizer to a frame and realize a narrower picture-frame.

(1) A liquid crystal display device according to an aspect of the invention includes: a rectangular polarizer attached to a liquid crystal display panel; a frame-shaped frame having four sides; a first bonding layer arranged only at a position biased toward any of edges on an upper surface of the polarizer, and bonding the polarizer to the liquid crystal display panel; and a second bonding layer arranged only at a position biased toward any of edges on a lower surface of the polarizer, and bonding the frame to the polarizer.

(2) In the liquid crystal display device according to the aspect of the invention, in (1), the second bonding layer may be arranged at a position overlapping the first bonding layer.

(3) In the liquid crystal display device according to the aspect of the invention, in (1) or (2), a light-emitting element may be accommodated in the interior of one side of the frame.

(4) In the liquid crystal display device according to the aspect of the invention, in any one of (1) to (3), an adhesive layer having a lower adhesive force than that of the second bonding layer may be arranged outside a region in which the second bonding layer is arranged, between the lower surface and the frame.

(5) In the liquid crystal display device according to the aspect of the invention, in any one of (1) to (4), the area of a region to which the first bonding layer is attached may be 2% or more of the area of the upper surface, and the area of a region to which the second bonding layer is attached may be 2% or more of the area of the lower surface.

DETAILED DESCRIPTION OF THE INVENTION

Figure 1:
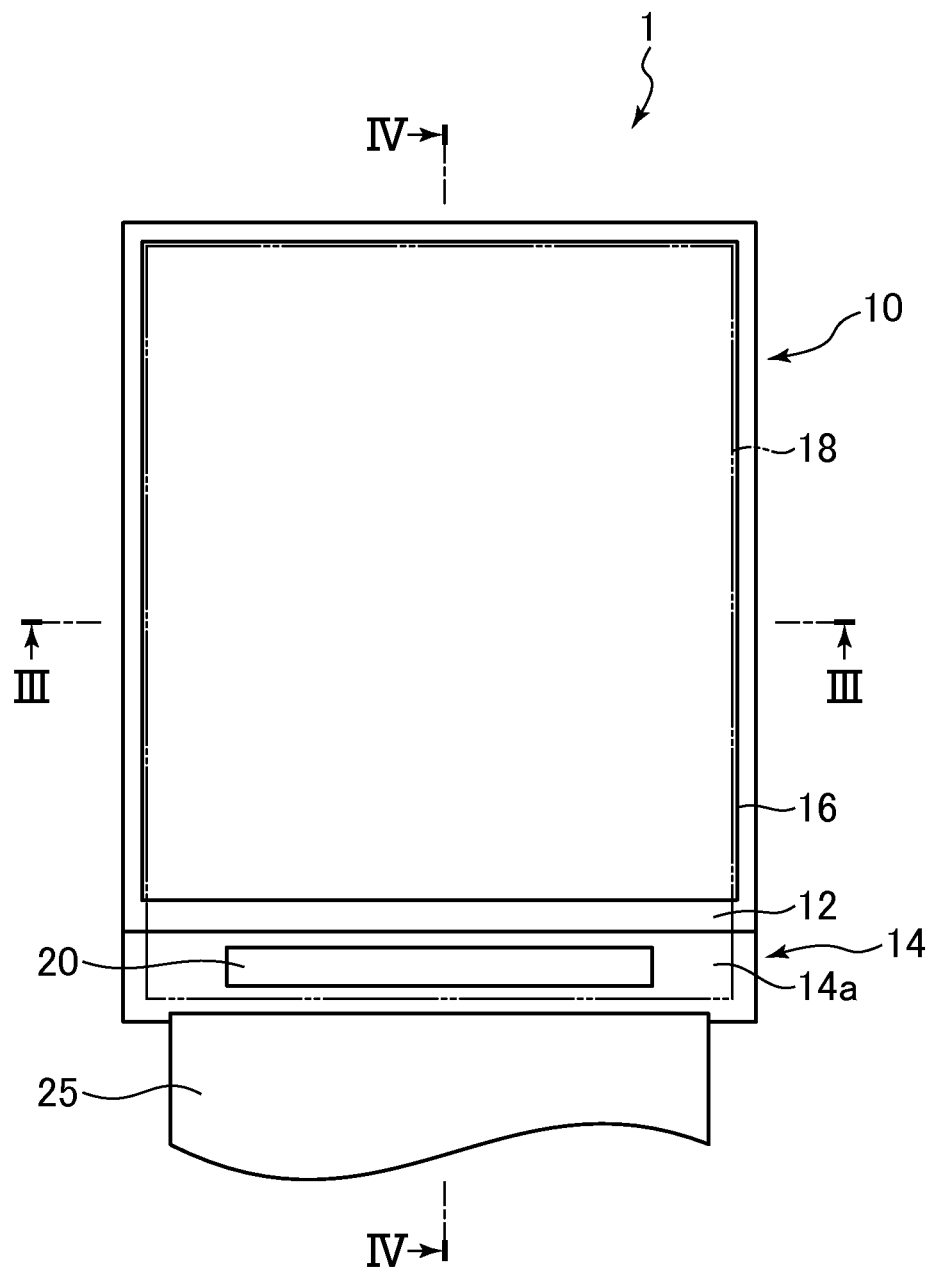
FIG. 1 is a schematic plan view of a liquid crystal display device according to the invention.

Hereinafter, embodiments of the invention will be described based on the drawings. In components appearing in the specification, components having the same function are denoted by the same reference numeral and sign, and the description thereof is omitted. In the drawings referred to in the following description, a portion having a feature is sometimes shown in an enlarged manner for convenience sake to facilitate the understanding of the feature. Therefore, the dimension ratio or the like of each component is not always the same as a real one. Moreover, materials or the like illustrated in the following description are illustrative only. Each component may be different from the illustrated one and can be implemented by modification within a range not changing the gist thereof.

First, a liquid crystal display device 1 according to a first embodiment of the invention will be described. The liquid crystal display device 1 according to the embodiment includes a rectangular liquid crystal display panel 10, rectangular upper and lower polarizers 16 and 18 attached to the liquid crystal display panel 10, a first bonding layer 22 bonding the lower polarizer 18 to the liquid crystal display panel 10, a frame-shaped frame 24 having four sides, and a second bonding layer 23 bonding the frame 24 to the lower polarizer 18.

Figure 2:
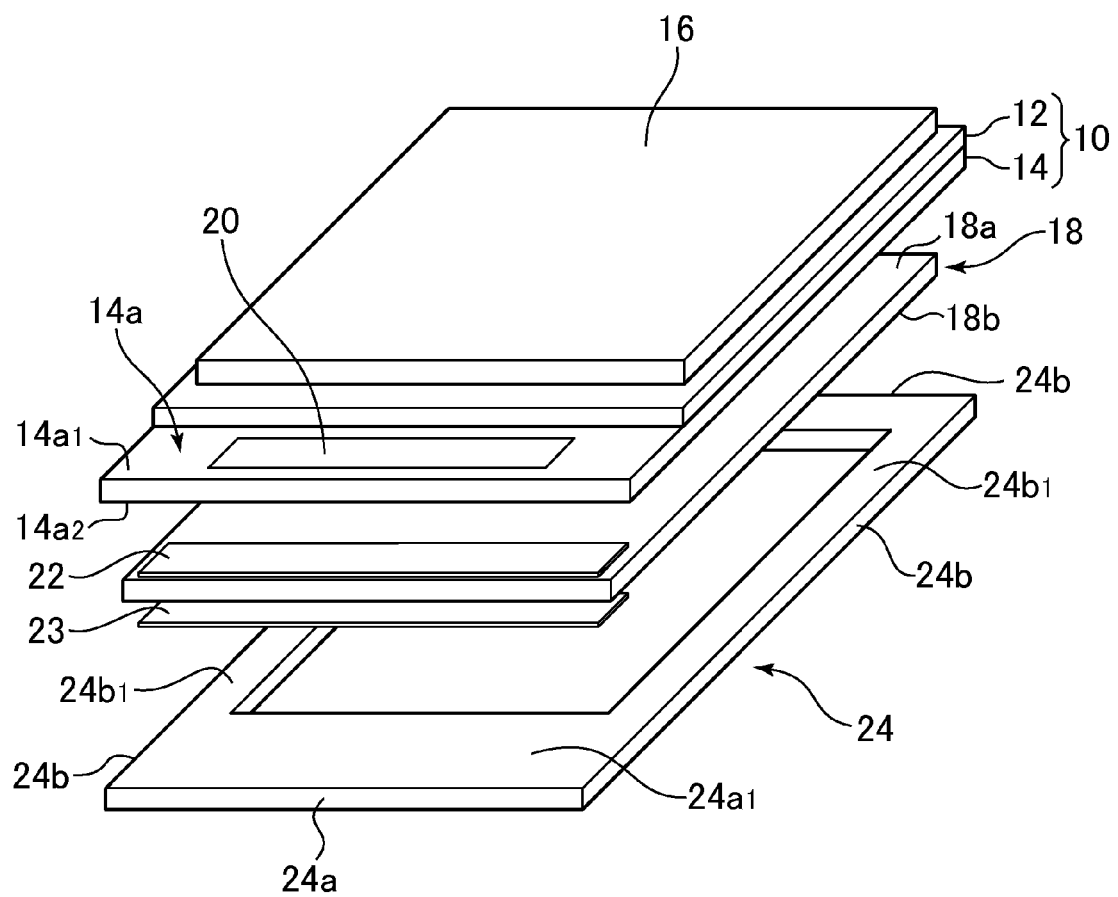
FIG. 2 is a schematic exploded perspective view of a liquid crystal display device according to a first embodiment of the invention.

FIG. 1 is a schematic plan view of the liquid crystal display device 1 according to the invention. FIG. 2 is a schematic exploded perspective view of the liquid crystal display device according to the first embodiment of the invention. For convenience of description, only the upper polarizer 16, the liquid crystal display panel 10, an integrated circuit chip 20, the lower polarizer 18, the first bonding layer 22, the second bonding layer 23, and the frame 24 are shown in FIG. 2.

The liquid crystal display panel 10 includes, for example, rectangular substrates 12 and 14. The substrate 12 is, for example, a color filter substrate, and disposed with not-shown color filters. The substrate 14 is, for example, a TFT (Thin Film Transistor) substrate. Not-shown liquid crystal is sealed between the substrate 12 and the substrate 14.

The substrate 14 is formed such that, for example, the length of the substrate 14 in a longitudinal direction thereof is larger than that of the substrate 12 in a longitudinal direction thereof. For this reason, a portion of the substrate 14 does not overlap the substrate 12 but protrudes in one direction. The portion of the substrate 14 not overlapping the substrate 12 but protruding therefrom is defined as a portion 14a, and upper and lower surfaces of the portion 14a are defined as an upper surface $14a_1$ and a lower surface $14a_2$, respectively. For example, the integrated circuit chip 20 and a flexible wiring board 25 are disposed on the upper surface $14a_1$.

The upper polarizer 16 is attached on the upper side of the substrate 12, while the lower polarizer 18 is attached on the lower side of the substrate 14. The lower polarizer 18 is disposed so as to cover at least a portion of the lower surface $14a_2$ of the portion 14a.

The first bonding layer 22 is a bonding layer bonding the lower polarizer 18 to a portion (for example, the substrate 14) of the liquid crystal display panel 10. As the first bonding layer 22, a double-faced tape or the like, for example, can be used. However, another member such as a liquid adhesive may be used as long as the lower polarizer 18 and the liquid crystal display panel 10 can be bonded together.

The first bonding layer 22 is arranged only at a position biased toward any of edges on an upper surface 18a of the lower polarizer 18. The first bonding layer 22 in the embodiment is arranged, for example, only in a region overlapping the lower surface $14a_2$ of the portion 14a. The area of the region to which the first bonding layer 22 is attached is preferably 2% or more of the area of the upper surface 18a of the lower polarizer 18. With such a configuration, it is possible to secure a bonding force that is enough to prevent the lower polarizer 18 and the liquid crystal display panel 10 from easily peeling off from each other.

The second bonding layer 23 is a layer bonding the lower polarizer 18 to the frame 24. As the second bonding layer 23, a double-faced tape or the like, for example, can be used similarly to the first bonding layer 22.

The second bonding layer 23 is arranged only at a position biased toward any of edges on a lower surface 18b of the lower polarizer 18. The second bonding layer 23 in the embodiment is arranged, for example, at a position overlapping the first bonding layer 22 in plan view, between the lower surface $14a_2$ of the portion 14a and the frame 24. The area of a region to which the second bonding layer 23 is attached is preferably 2% or more of the area of the lower surface 18b of the lower polarizer 18. With such a configuration, it is possible to secure a bonding force that is enough to prevent the lower polarizer 18 and the frame 24 from easily peeling off from each other.

The region in which the second bonding layer 23 is arranged preferably overlaps, in plan view, the region in which the first bonding layer 22 is arranged. With such a configuration, the region in which the liquid crystal display panel 10 is fixed to the lower polarizer 18 overlaps the region in which the frame 24 is fixed to the lower polarizer 18. For this reason, even when the lower polarizer 18 shrinks under heat, the shifting in position of the frame 24, the lower polarizer 18, and the liquid crystal display panel 10 can be suppressed.

The frame-shaped frame 24 having four sides is formed of, for example, a resin formed by molding. In the interior of one side of the frame 24, a not-shown light-emitting element-accommodating portion is disposed. In the light-emitting element-accommodating portion, a not-shown light-emitting element is accommodated. An upper surface of the one side 24a in which the light-emitting element-accommodating portion is disposed is defined as a light-emitting element-accommodating portion upper surface $24a_1$, and upper surfaces of the other three sides 24b are defined as upper surfaces $24b_1$.

The light-emitting element-accommodating portion upper surface $24a_1$ preferably overlaps, in plan view, the region in which the first bonding layer 22 is arranged. The second bonding layer is preferably arranged only on the light-emitting element-accommodating portion upper surface $24a_1$. With such a configuration, the frame 24, the lower polarizer 18, and the liquid crystal display panel 10 are fixed only in the region corresponding to the light-emitting element-accommodating portion upper surface $24a_1$ among the upper surfaces of the four sides of the frame 24. Since the light-emitting element-accommodating portion is disposed in the one side 24a, the light-emitting element-accommodating portion upper surface $24a_1$ has a sufficient area for arranging the second bonding layer 23 thereon. Therefore, the other three sides 24b of the frame 24 and the lower polarizer 18 do not need to be fixed to each other by, for example, arranging a bonding layer. For this reason, the widths of the three sides 24b can be narrowed.

Figure 3:
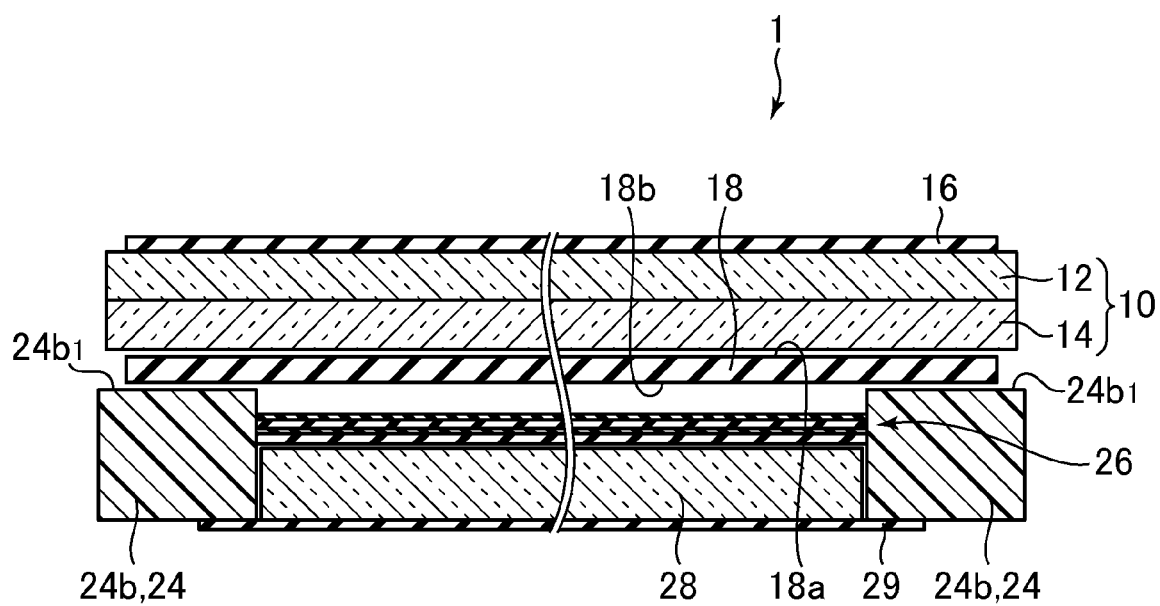
FIG. 3 is a schematic cross-sectional view of the liquid crystal display device according to the first embodiment taken along line III-III.
Figure 4:
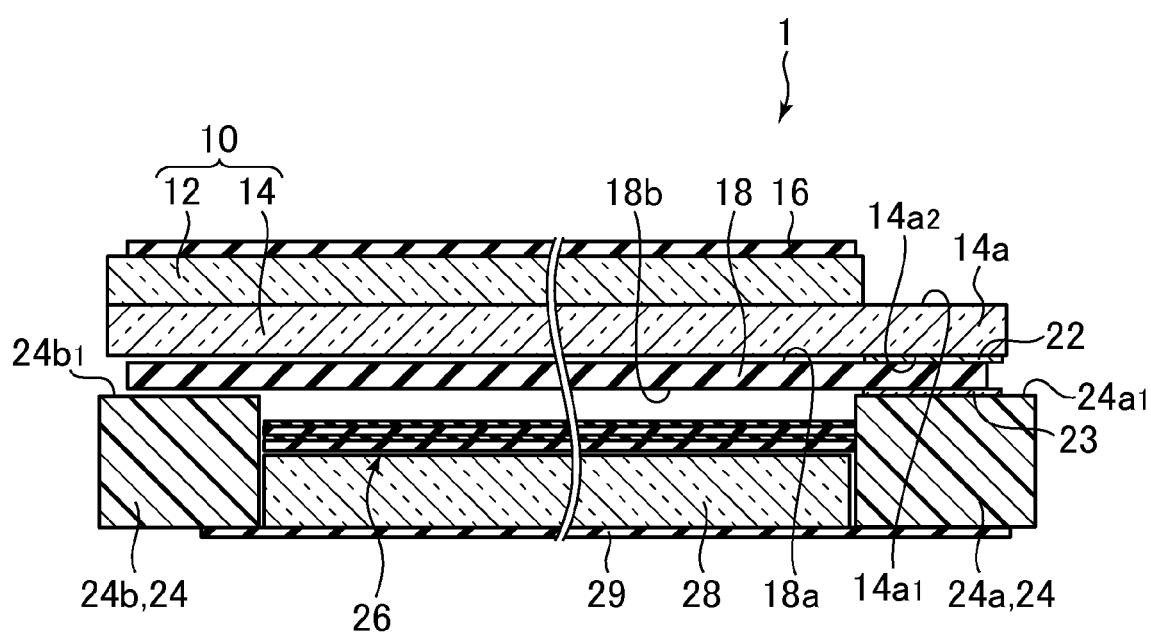
FIG. 4 is a schematic cross-sectional view of the liquid crystal display device according to the first embodiment taken along line IV-IV.

FIG. 3 is a schematic cross-sectional view of the liquid crystal display device 1 according to the first embodiment taken along line III-III. FIG. 4 is a schematic cross-sectional view of the liquid crystal display device according to the first embodiment taken along line IV-IV. Inside the frame 24, an optical sheet 26 and a light guide plate 28 are accommodated. The optical sheet 26 is arranged on the upper side of the light guide plate 28. The light guide plate 28 is arranged so as to overlap the liquid crystal display panel 10 in plan view. Light incident from a not-shown point light source is converted by the light guide plate 28 into a surface light source. The frame 24, the optical sheet 26, and the light guide plate 28 constitute a backlight.

A reflective film 29 is disposed on the lower side of the frame 24. The reflective film 29 is arranged so as to cover the lower side of the light guide plate 28. With this configuration, light incident on the light guide plate 28 is reflected by the reflective film 29 and emitted upward.

In the liquid crystal display device 1 in the embodiment, the second bonding layer 23 is arranged, for example, only on the light-emitting element-accommodating portion upper surface $24a_1$. For this reason, the lower surface 18b of the lower polarizer 18 is fixed only to the light-emitting element-accommodating portion upper surface $24a_1$ of the frame 24, so that the lower surface 18b and the upper surfaces $24b_1$ of the three sides 24b are not fixed to each other.

The first bonding layer 22 in the embodiment is arranged in the region overlapping, in plan view, the second bonding layer 23 on the upper surface 18a of the lower polarizer 18, that is, only between the upper surface 18a and the lower surface $14a_2$ of the portion 14a. For this reason, the upper surface 18a of the lower polarizer 18 is fixed only to the lower surface $14a_2$ of the portion 14a of the substrate 14.

As described above, according to the liquid crystal display device 1 according to the invention, the first bonding layer 22 is arranged only at a position biased toward any of edges on the upper surface 18a of the polarizer 18, while the second bonding layer 23 is arranged only at a position biased toward any of edges on the lower surface 18b of the polarizer 18. For this reason, the upper surface 18a of the polarizer 18 other than the region in which the first bonding layer 22 is arranged is not fixed to the liquid crystal display panel 10, while the lower surface 18b other than the region in which the second bonding layer 23 is arranged is not fixed to the frame 24.

Hence, even when the polarizer 18 shrinks under heat, the polarizer 18 other than the region to which the first bonding layer 22 and the second bonding layer 23 are attached can move relative to the liquid crystal display panel 10 and the frame 24. For this reason, the actions of stress applied from the polarizer 18 to the liquid crystal display panel 10 and stress applied from the polarizer 18 to the frame 24 can be suppressed. For this reason, it is possible to suppress the occurrence of bowing in the liquid crystal display panel 10, the polarizer 18, and the frame 24.

The first bonding layer 22 is arranged only at a position biased toward any of edges on the upper surface 18a of the polarizer 18, and not arranged on the entire upper surface 18a. For this reason, it is possible to prevent the peeling off of the first bonding layer 22 due to the shrinkage of the polarizer 18. Similarly, since the second bonding layer 23 is arranged only at a position biased toward any of edges on the lower surface 18b of the polarizer 18, it is possible to prevent the peeling off of the second bonding layer 23 due to the shrinkage of the polarizer 18. Hence, compared to a liquid crystal display device not having this configuration, the liquid crystal display device 1 in the embodiment can prevent the peeling off of the first bonding layer 22 and the second bonding layer 23.

Among the four sides of the frame 24, the bonding layer 23 is not arranged on the three sides 24b other than, for example, the one side 24a on which the second bonding layer 23 is arranged, so that the three sides 24b are not fixed to the polarizer 18. For this reason, the widths of the three sides 24b can be narrowed. As described above, it is possible according to the embodiment to realize the liquid crystal display device 1 with a narrow picture-frame, compared to a liquid crystal display device not having this configuration.

Next, a liquid crystal display device 1 according to a second embodiment of the invention will be described based on the drawings. The second embodiment differs from the first embodiment only in that an adhesive layer 30 having a lower adhesive force than that of a second bonding layer 23 is arranged outside a region in which the second bonding layer 23 is arranged, between a lower surface 18b of a polarizer 18 and a frame 24. Therefore, the adhesive layer 30 and configurations relating to the adhesive layer 30 are described below, and the description of configurations similar to those of the liquid crystal display device 1 in the first embodiment is omitted.

Figure 5:
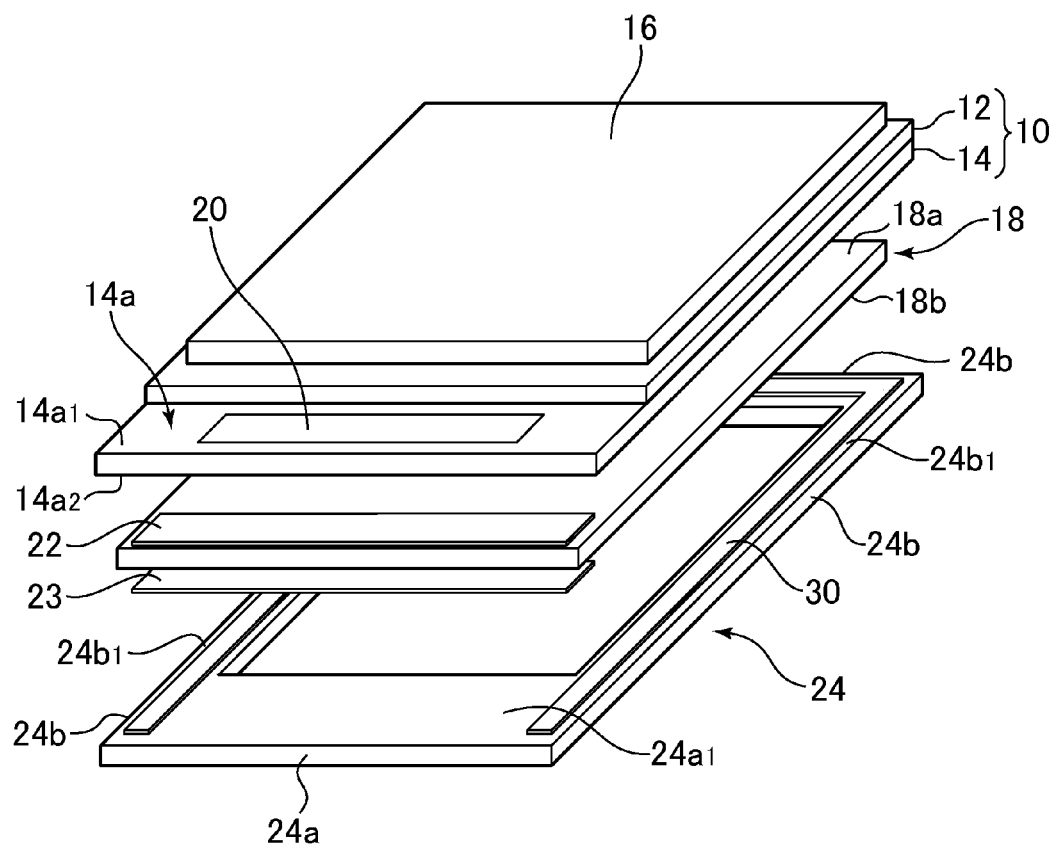
FIG. 5 is a schematic exploded perspective view of a liquid crystal display device according to a second embodiment of the invention.

FIG. 5 is a schematic exploded perspective view of the liquid crystal display device 1 according to the second embodiment of the invention. As shown in FIG. 5, in the liquid crystal display device 1 in the embodiment, a first bonding layer 22 is arranged between a lower surface $14a_2$ of a portion 14a and an upper surface 18a of the lower polarizer 18, while the adhesive layer 30 is arranged, for example, between the lower surface 18b of the lower polarizer 18 and upper surfaces $24b_1$ of other three sides 24b of the frame 24.

Figure 6:
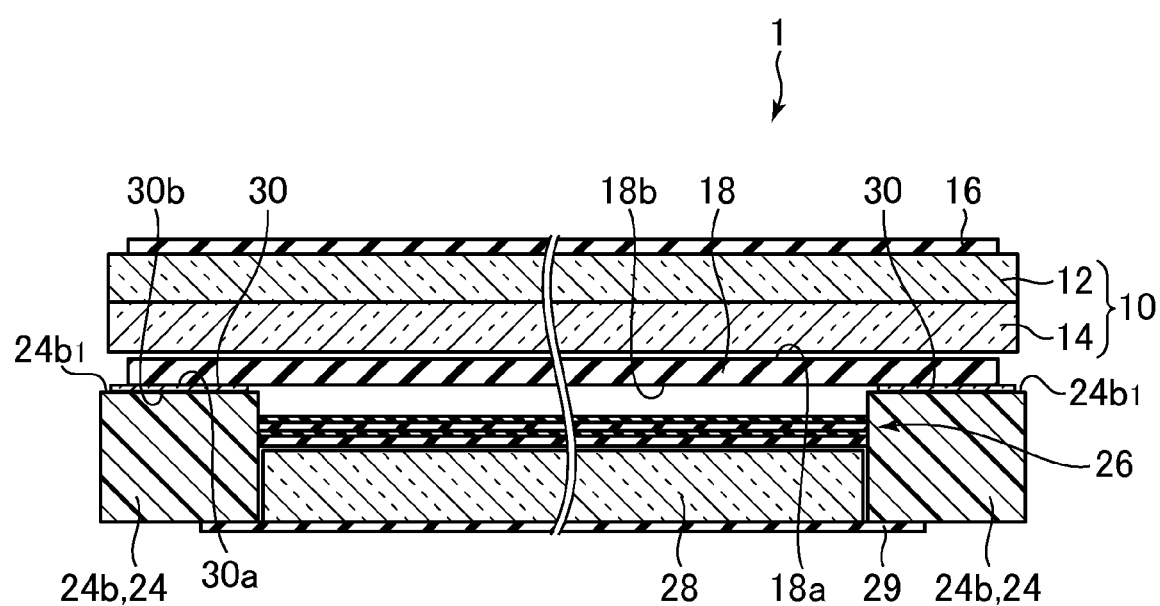
FIG. 6 is a schematic cross-sectional view for explaining the liquid crystal display device according to the second embodiment.
Figure 7:
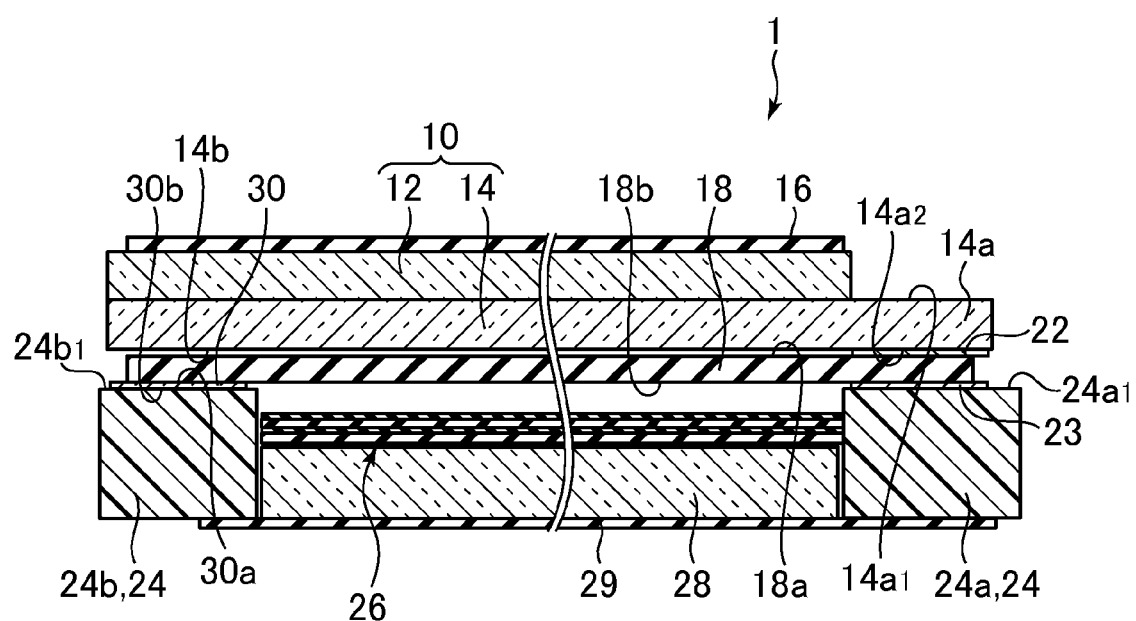
FIG. 7 is a schematic cross-sectional view for explaining the liquid crystal display device according to the second embodiment.

FIGS. 6 and 7 are schematic cross-sectional views for explaining the liquid crystal display device 1 according to the second embodiment. FIG. 6 is a cross-sectional view of the liquid crystal display device 1 taken along the line corresponding to FIG. 3, while FIG. 7 is a cross-sectional view of the liquid crystal display device 1 taken along the line corresponding to FIG. 4. The adhesive layer 30 in the liquid crystal display device 1 in the embodiment has a lower adhesive force than that of the second bonding layer 23.

As the adhesive layer 30, a double-faced tape or the like, for example, can be used. However, a gel-like sheet may be used as long as it can adhere to both the lower surface 18b of the lower polarizer 18 and the upper surface $24b_1$ of the frame 24 and the lower surface 18b of the lower polarizer 18 can move while remaining in contact with an upper surface 30a of the adhesive layer 30.

The strength of adhesive force of the upper surface 30a of the adhesive layer 30 is preferably such that when the lower polarizer 18 moves parallel to the upper surface $24b_1$ of the frame 24 such as when, for example, the lower polarizer 18 shrinks under heat, the lower surface 18b of the lower polarizer 18 can move while remaining in contact with the upper surface 30a of the adhesive layer 30. Specifically, for example, the adhesive force of the first bonding layer 22 and the second bonding layer 23 may be 6.0±5.0 N/25 mm, and the adhesive force of the upper surface 30a of the adhesive layer 30 may be 1.0 N/25 mm or less.

Specifically, the adhesive force as mentioned herein means a force required for peeling off a bonding layer such as a tape of 25 mm×150 mm in size, which was attached to a glass substrate by one reciprocation of a roller while applying a pressure of 19.6 N and then left at a room temperature for 20 min, from the glass substrate at an angle of 90° at a rate of 300 mm/min.

With such a configuration, in the liquid crystal display device 1 in the second embodiment, even when the lower polarizer 18 shrinks under heat, the lower surface 18b of the lower polarizer 18 moves while remaining in contact with the upper surface 30a of the adhesive layer 30, so that the position of the adhesive layer 30 does not change. For this reason, the peeling off of the adhesive layer 30 is prevented. Moreover, in the liquid crystal display device 1 in the second embodiment, since the adhesive layer 30 is arranged, the polarizer 18 and the liquid crystal display panel 10 can be strongly held to the frame 24, in addition to the advantageous effect in the first embodiment.

The strength of adhesive force of a lower surface 30b of the adhesive layer 30 is preferably such that when the lower surface 18b moves while remaining in contact with the upper surface 30a of the adhesive layer 30, the adhesive layer 30 does not move from the upper surface $24b_1$ of the frame 24. With such a configuration, even when the lower surface 18b of the lower polarizer 18 moves while remaining in contact with the upper surface 30a of the adhesive layer 30, the adhesive layer 30 can be prevented from shifting in position.

Moreover, an adhesive layer having an adhesive property such that the upper surface 18a of the lower polarizer 18 can move while remaining in contact with the adhesive layer may be also arranged outside the region in which the first bonding layer 22 is disposed, between the upper surface 18*a* of the lower polarizer 18 and a lower surface 14*b* of the substrate 14. By causing such an adhesive layer to be present between the upper surface 18*a* of the lower polarizer 18 and the lower surface 14*b* of the substrate 14, the liquid crystal display panel 10 can be strongly held to the lower polarizer 18 compared to a liquid crystal display device not having such a configuration.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
    a rectangular polarizer attached to a liquid crystal display panel;
    a frame-shaped frame having four sides;
    a first bonding layer arranged only at a position biased toward any of edges on an upper surface of the polarizer, and bonding the polarizer to the liquid crystal display panel; and
    a second bonding layer arranged only at a position biased toward any of edges on a lower surface of the polarizer, and bonding the frame to the polarizer
    wherein an adhesive layer having a lower adhesive force than that of the second bonding layer is arranged outside a region in which the second bonding layer is arranged, between the lower surface and the frame.

2. The liquid crystal display device according to claim 1,
    wherein the second bonding layer is arranged at a position overlapping the first bonding layer.

3. The liquid crystal display device according to claim 1,
    wherein a light-emitting element is accommodated in the interior of one side of the frame.

4. The liquid crystal display device according to claim 1,
    wherein the area of a region to which the first bonding layer is attached is 2% or more of the area of the upper surface, and the area of a region to which the second bonding layer is attached is 2% or more of the area of the lower surface.

\* \* \* \* \*